United States Patent Office 3,135,130
Patented June 2, 1964

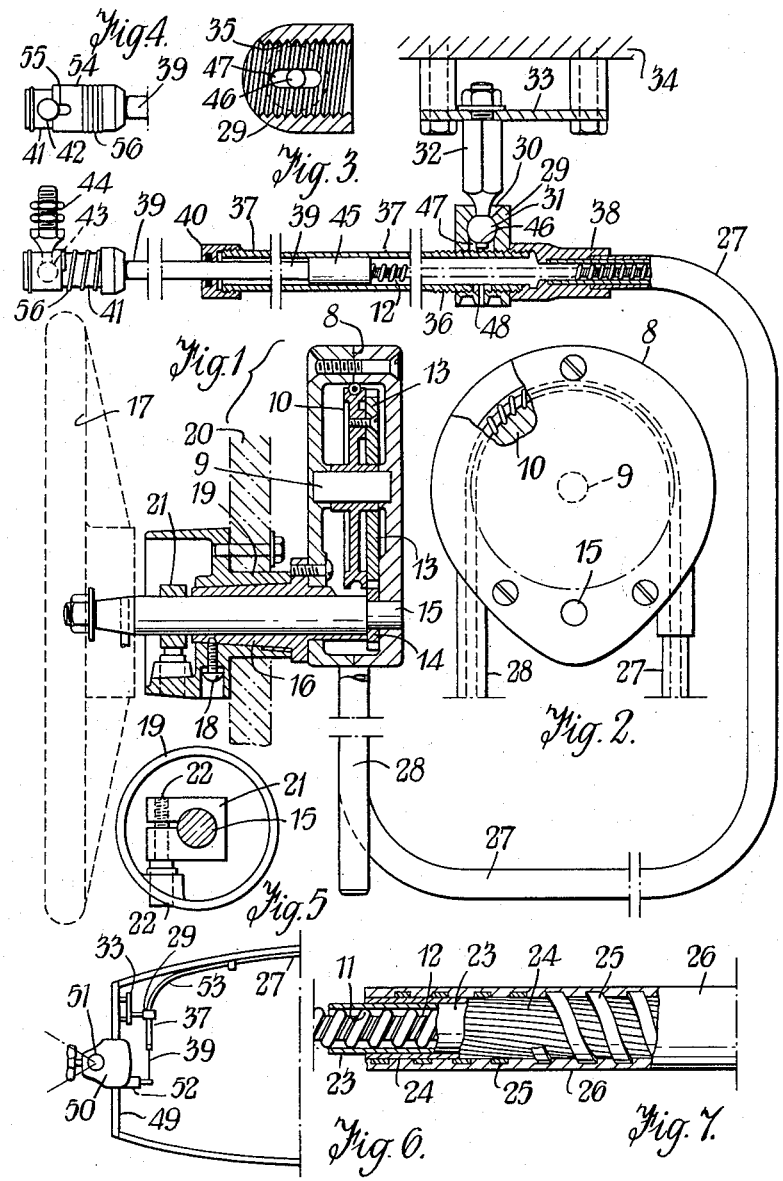

3,135,130
MARINE STEERING CONTROLS
James Sydney Bentley, London, England, assignor to Teleflex Products Limited, London, England, a British company
Filed Nov. 2, 1961, Ser. No. 149,724
Claims priority, application Great Britain Nov. 7, 1960
9 Claims. (Cl. 74—485)

This invention relates to marine steering controls for the steering arm or tiller of a rudder, but more particularly of an outboard driving unit, mounted astern of the transom, and has for its object to provide such controls of the type which include a multi-stranded flexible cable working in a guiding conduit, which are especially suitable for marine usages and purposes.

In accordance with a main feature of the present invention, the multi-stranded flexible cable utilized is of the type known by the registered trademark "Teleflex" which has a projecting helix of uniform pitch on the exterior and is designed for transmitting push and pull.

This utilization of a flexible push-and-pull cable with a helical projection thereon, enables the necessarily long movement of the cable, between the extreme limits of the steering movements at the controlled end adjacent the steering arm, to be accommodated at the transmitting end in a small space, by causing the cable to "wrap around" a gear wheel of desired diameter, the teeth of which engage the helical projections. This gear wheel can be driven directly from the steering wheel or the like, or through a reducing or multiplying gear.

According to a further feature of the invention, the guiding conduit, which extends from the "wrapped head" casing of the transmitter to an anchorage to or adjacent the transom—which anchorage is mounted for universal movement (except about the axis of the conduit)—as it is formed for marine purposes comprises an inner tube of plastic such as polytetrafluorethylene, nylon, high-density polyethylene or otherwise in which the flexible cable can slide with slight clearance. This inner tube is covered by a plurality of long-pitch helical wires in contact, wrapped about somewhat lightly by a helically wound metal strip with gaps between the turns. The whole has an extruded plastic covering, the inner surface of which enters intimately into the spaces between the long-pitch wires, the spaces between the helical strip wrapping and said wires, and other unevennesses of the wrapper wire surface; the exterior surface is cylindrical and plain.

The thus-formed conduit, with or without the cable therein, can readily be laid in any desired position as it is sufficiently flexible to be bent into required curves, or left straight. Further, in one or more places it may be anchored or secured in position to the fixed structure, and particularly a curved flexible portion can be left for substantially free movement of its end remote from the steering wheel or the like, the actual end being that secured to the anchorage to or adjacent the transom, already referred to.

Still further according to the invention, this anchorage is formed by a housing of thermoplastic material, for example nylon, which is of generally cylindrical shape. One flat end has an opening leading to a part-spherical seating for the mounting of a ball at the end of a metal block bolted to a bracket attached to the transom of a boat or adjacent thereto. At right angles to this, the housing is bored through and screw-threaded to take one screwed end of a stiff metal tube which passes across the housing and projects at one side, and has screwed and secured thereto a connector fixed to the end of the conduit.

The other part of the stiff tube projects from the housing on the side remote from the connection of the conduit and forms an extension of the conduit, and into it and about half-way of its length (when the steering is in the straight-ahead or astern position) the cable extends. It is here connected to one end of a stiff rod which passes out of the end of the stiff tube (preferably through a packed gland). The projecting portion of the stiff rod (with the parts still in the straight-ahead or astern position) is substantially equal in length to the part in the tube, and the outer end of the stiff rod carries a housing with a part-spherical seating for a ball fitting secured to the appropriate position of the steering arm of the outboard unit.

In order that the invention may be better understood, it will now be described with reference to the accompanying somewhat diagrammatic drawings which are given by way of example only and in which:

FIG. 1 is a comprehensive view, partly in sectional elevation and partly in sectional plan, of an embodiment of a marine steering control according to the invention.

FIG. 2 is a side elevation of the "wrapped head" part of FIG. 1.

FIG. 3 is a vertical section to an enlarged scale of the thermoplastic material anchorage of the control, taken through the screwed bore for the conduit, but detached from the conduit.

FIG. 4 is an end elevation of the connector shown in FIG. 1 at the end of the stiff rod, but with the parts in another position.

FIG. 5 is an end elevation taken from the left-hand side of FIG. 1, of the brake for the spindle of the steering wheel.

FIG. 6 is a diagrammatic plan of the stern of a boat showing one arrangement of a control in accordance with the invention, in relation to the boat and an outboard motor mounted to turn on a vertical axis, and FIG. 7 is a view, partly in section, of a portion of a guiding conduit for a marine steering control in accordance with the invention.

In the particular method of carrying the invention into effect shown in FIGS. 1 to 5, the wrapped head at the transmitting end comprises a two-part casing 8 having a spindle 9 for the toothed gear 10 to co-operate with the cable, that is, with a peripheral groove having teeth to mesh with the projecting helical turns 11 (FIG. 6) on the exterior of the cable 12. This gear 10 has connected thereto by screws, a coaxial toothed wheel 13 which meshes with a smaller toothed wheel or pinion 14 fixed to the end of a main steering spindle 15 which passes out from the casing through a long flanged bearing 16 attached to the casing, and the end of which spindle is adapted to be secured to the hub of the steering wheel 17.

The front projecting portion of the long bearing 16 constitutes an adaptor, is slightly tapered on the exterior and fitted within and attached by a screw 18 to a cupped sleeve 19 adapted to be bolted in a bore of the dashboard 20 (or equivalent part of the vessel). The open face of the cup is directed towards the rear of the steering wheel 17 and the portion of the spindle 15 in this cup has a split braking sleeve 21 mounted thereon (FIG. 5) which co-operates with a brake or damper screw 22 carried by and projecting inwardly from the periphery of the cup 19. This brake or damper 21 can have its gripping pressure varied by adjusting the screw 22 and serves to hold the spindle 15 from any movement due to reaction operating through the cable 12. Not only is this a desirable feature in itself, but it relieves the steersman of the strain and effort of holding the steering wheel 17 in any position, against the reaction.

The cable 12 with its projecting helix, from the wrapped head to an anchorage to be hereafter particularly described, slides in a flexible guiding conduit especially formed for marine purposes. As shown in FIG. 7, it comprises an inner tube 23 of plastic such as polytetrafluorethylene, nylon, high-density polyethylene or otherwise in which the flexible cable 12 can slide with slight clearance. This inner tube 23 is covered by a plurality of long-pitch helical wires 24 in contact, wrapped about somewhat lightly by a helically wound metal strip 25 with gaps between the turns. The whole has an extruded plastic covering 26, the inner surface of which enters intimately into the spaces between the long-pitch wires 24, the spaces between the helical strip wrapping 25 and said wires, and other unevennesses of the wrapped wire surface; the exterior surface is cylindrical and plain.

The thus-formed conduit 27, with or without the cable 12 therein, can readily be laid in any desired position as it is sufficiently flexible to be bent into required curves, or left straight. Further, in one or more places it may be anchored or secured in position to the fixed structure.

The end of the cable 12 adjacent the wrapped head 8, after passing round the pulley 10 with the desired angle of contact, which may even exceed 180°, passes into a so-called spent tube 28 which (FIGS. 1 and 2) extends downwardly and is of sufficient length to accommodate the end of the cable when the steering control is in one of its extreme positions.

The anchorage to which the end of the flexible guiding conduit 27 is secured is formed by a housing 29 of thermoplastic material, for example nylon, which is of general cylindrical shape. One flat end has a circular opening 30 leading to a part-spherical seating of larger diameter for the mounting of a ball 31 at the end of a metal block 32 bolted to a bracket 33 to be attached to the transom 34 of a boat, or adjacent thereto. At right angles to this, the housing 29 is bored through and screw-threaded at 35 (FIG. 3) to take one screwed end 36 of a stiff metal tube 37 which passes across the housing and projects at one side, and has screwed and secured thereto a connector 38 fixed to the end of the conduit 27.

The other part of the stiff tube 37 projects from the housing 29 on the side remote from the connection of the conduit 27 and forms a stiff extension of said conduit, and into it and about half-way of its length (when the steering is in the straight-ahead or astern position) the cable 12 extends as indicated in the upper part of FIG. 1. It is here connected to one end of a stiff rod 39 which passes out of the stiff tube 37 through a packed gland 40. The projecting portion of the stiff rod 39 out of the gland 40 (with the parts still in the straight-ahead or astern position) is substantially equal to the length of the part of this rod in the tube 37. The outer end of the stiff rod 39 carries a housing 41 with a part-spherical seating 42 for a ball-ended fitting 43 adapted to be secured by a screwed stem and locknuts 44 to the appropriate position of the steering arm of an outboard motor.

To enable the stiff rod 39 to be readily connected to and disconnected from the engine mounting, the housing 41 has slidably mounted thereon a sleeve 54 which is slotted at 55 to pass over the narrow neck portion of the connector adjacent the actual ball. A compression spring 56 is provided on the housing 41 to hold the sleeve 54 with the parts in the engaged position, as shown in FIG. 1. To disconnect the parts it is simply necessary to push back the sleeve 54 fully to compress the spring 56, which leaves the ball free to be withdrawn from the housing.

45 is a connector between the ends of the cable 12 and the rod 39, within the stiff tube 37. This connector has a bore so that the ends of the cable and rod located therein are swaged into position to enable the cable, connector and rod to move as one. The connector is a sliding fit within the tube 37 and its ends form abutments or stops for limiting the movements of the rod in the tube.

The front of the ball 31 which is located in the housing 29, has a short pin or stud-like projection 46 thereon of circular shape. This operates in a slot 47 in the housing, of the same width. In this manner the stiff tube 37 is prevented from rotating on its own axis.

However, during the steering movements generally, the thermoplastic housing 29 rocks in any required direction and the flexible conduit 27 at that portion of its length where it is attached to the connector 38, is left substantially free and freely movable so that it accommodates itself to the movements of the housing.

This latter has a greasing nipple 48 in the other flat face, and the screwed end 36 of the tube 37, in that portion which comes within the housing, has one or more apertures, covered over by the housing 29 but to allow the grease to pass to the interior of the tube 37.

Marine controls in accordance with the invention obviously vary in the length of the flexible conduit portions 27 and stiff tubular portions 37, to suit particular cases. FIG. 6, however, shows the stern of a boat to the transom 49 of which an outboard motor 50 is clamped in such manner that it can oscillate about a vertical axis 51. The tiller or handle portion 52 of the motor casing is connected to the stiff rod 39 of the control so that this stiff rod and the stiff tube 37 can rock with the housing 29 which is attached to the bracket 33. As shown in the figure, the portion 53 of the conduit 27 is left free to accommodate itself to the rocking action of the housing 29. This figure does not show the steering wheel, but obviously it can be mounted fore or aft, either amidships or to port or starboard, according to particular circumstances.

In other cases where the outboard motor is not utilized but where the steering is by a tiller-operated rudder, the stiff rod 39 is suitably connected to the tiller.

The invention is not limited to the precise forms or details of construction herein described, as these may be varied to suit particular requirements.

What I claim is:

1. A rotary boat-steering mechanism unit comprising a flexible cable having an outer projected helix adapted to engage a toothed wheel, a housing, a toothed wheel therein and gearing means adapted to rotate the said toothed wheel, a steering wheel and steering shaft extending into said housing and adapted to actuate the said gearing means, a spent tube to receive the free end of said cable, a flexible conduit in which the said cable is slidably mounted, a ball and socket bracket means fixedly mounted in the rear of a boat adjacent the steering handle of the outboard motor, tiller or the like, the free end of said bracket means receiving and securing the rear portion of said conduit, a ball and socket coupling means detachably mounted on the steering handle of an outboard motor, tiller or the like, a stiff shaft detachably connected at one end to the said cable and at the other end to the said ball and socket coupling means mounted on the steering handle, tiller or the like.

2. Claim 1 having a tube housing portion of the said stiff shaft, said tube detachably secured to the free end of the ball and socket bracket means which is fixedly mounted in the rear end of the boat and said tube joined at one end to the flexible conduit, a connector which is a sliding fit disposed within said tube and connecting one end of the said stiff shaft to the end of the said flexible cable, and a packed gland through which the said shaft movably extends enclosing the opposite end of said tube.

3. Claim 2 having a split braking sleeve through which the said steering shaft rotatably extends, said braking sleeve having a damper screw adjustably mounted therein, and means for holding said braking sleeve fast.

4. Claim 2 having a grease nipple adapted to permit injection of lubricants into the said tube housing the stiff shaft which is connected to the said cable.

5. Claim 2 in which the flexible conduit comprises an inner tube of pliable plastic such as high density polyethylene, a plurality of wires wrapped in a long pitch helix around the said inner tube, a helically wound metal strip wound lightly around the said wires and inner tube, an outer extruded plastic covering, the inner surface of which enters intimately into the space between the said long pitch wires, spaces between the said metal strip helical wrapping and said wires and other unevennesses of the wrapped wire surface.

6. A boat steering mechanism unit, of the kind in which one portion is fixedly mounted in the boat and another connected to the steering arm of the rudder, or of an outboard driving unit mounted astern of the transom of the boat, comprising a push-pull multi-stranded flexible control cable having a projecting helix of uniform pitch on the exterior, said cable being mounted to slide in and extend from each end of a flexible guiding conduit, a casing fixed at one end of said conduit, bearings in such casing for a spindle, a toothed wheel mounted on said spindle with which the portion of the cable extending from one end of the flexible guiding conduit is engaged so that its projecting helix meshes with the teeth thereof over an angle of approximately 180°, a spent tube fixed to the casing to accommodate the end portion of the cable beyond where it meshes with the toothed wheel, a bearing fixed to and opening into the casing with its axis parallel to the axis of the spindle of the toothed wheel, means for fixing this bearing to a fixed point of the boat, a steering spindle mounted in said bearing so that one end projects into and extends across the casing, a toothed pinion secured on this end of the steering spindle, a toothed wheel meshing with said pinion and mounted coaxial with the toothed wheel in mesh with the cable, and fixed to said toothed wheel by screws, a steering wheel fixed to the other end of the steering spindle, a connector at the other end of the flexible guiding conduit and having a bore therethrough into one end of which the flexible guiding conduit is secured, and which is internally screw-threaded at the other end, a housing with a flat surface located adjacent and in contact with the internally screw-threaded end of the connector and having a similar screw-threaded bore therethrough in axial alignment with the bore of the connector, a stiff metal tube having one end screw-threaded on the exterior to screw into the screwed bore of the housing from side to side and to project beyond the flat surface thereof and in screwed engagement with the screwed bore of the connector, the other end of the stiff tube having a gland, a stiff rod passing through such gland, the inner end of which rod located in the stiff tube is secured to the end of the flexible cable which extends out of the connector, whilst the outer end of said rod which projects beyond the stiff tube has means by which it is connected to the steering arm of the rudder or outboard driving unit, a part-spherical seating in the housing axially displaced from the screwed bore and leading to a circular opening in one surface of the housing of smaller diameter than the spherical seating, and a bracket for fixed attachment to the transom of the boat, which bracket has fixed thereto a stiff metal rod which passes with clearance into and through the circular opening in the housing and terminates in a fixed ball for engagement in the part-spherical seating.

7. A boat steering mechanism unit as claimed in claim 6, in which the fixed ball for engagement in the part-spherical seating has a stud-like projection of circular section, and the housing an elongated slot of the same width as the diameter of the projection, in which the projection engages to hold the housing from movement about the axis of the conduit but permit rocking motions of the housing on the ball.

8. A boat steering mechanism unit as claimed in claim 6, in which the housing has a lubricaitng nipple opening from the exterior into the screwed bore of the housing, and in which the stiff tube in the bore has apertures for the passage of the lubricant to the interior thereof.

9. A boat steering mechanism unit as claimed in claim 6, in which adjustable braking means are provided operating upon a portion of the surface of the steering spindle and connected to the bearing for such spindle.

References Cited in the file of this patent
UNITED STATES PATENTS

| | | |
|---|---|---|
| 2,767,596 | Simon et al. | Oct. 23, 1956 |
| 2,890,595 | Loeffler | June 16, 1959 |
| 2,957,352 | Pierce | Oct. 25, 1960 |

FOREIGN PATENTS

| | | |
|---|---|---|
| 1,237,474 | France | June 20, 1960 |